United States Patent
Yoshida et al.

(10) Patent No.: US 7,624,387 B2
(45) Date of Patent: Nov. 24, 2009

(54) COMPILER, PROGRAM PRODUCT, COMPILATION DEVICE, COMMUNICATION TERMINAL DEVICE, AND COMPILATION METHOD

(75) Inventors: Takehiro Yoshida, Nagoya (JP); Takuji Kawamoto, Nagoya (JP)

(73) Assignee: Panasonic Corporation, Osaka (JP)

( * ) Notice: Subject to any disclaimer, the term of this patent is extended or adjusted under 35 U.S.C. 154(b) by 902 days.

(21) Appl. No.: 10/819,166

(22) Filed: Apr. 7, 2004

(65) Prior Publication Data

US 2004/0205738 A1 Oct. 14, 2004

(30) Foreign Application Priority Data

Apr. 10, 2003 (JP) ............... 2003-106413

(51) Int. Cl.
*G06F 9/45* (2006.01)
(52) U.S. Cl. ............... 717/152; 717/151; 717/140
(58) Field of Classification Search .......... 717/151–153
See application file for complete search history.

(56) References Cited

U.S. PATENT DOCUMENTS

| | | | | |
|---|---|---|---|---|
| 4,773,007 A | * | 9/1988 | Kanada et al. | 717/160 |
| 5,067,068 A | * | 11/1991 | Iwasawa et al. | 717/160 |
| 5,146,594 A | * | 9/1992 | Iitsuka | 717/156 |
| 5,581,762 A | * | 12/1996 | Hayashi et al. | 717/144 |
| 5,704,053 A | * | 12/1997 | Santhanam | 717/158 |
| 5,764,993 A | * | 6/1998 | Shindo | 717/160 |
| 5,842,022 A | * | 11/1998 | Nakahira et al. | 717/160 |

(Continued)

FOREIGN PATENT DOCUMENTS

JP 06-202875 7/1994

OTHER PUBLICATIONS

Ishizaki et al.,"An Algorithm for Automatic Detection of Loop Indices for Communication Overlapping",1997, Springer Berlin / Heidelberg,ISSN 0302-9743 (Print) 1611-3349 (Online), retried from <http://www.springerlink.com/content/m22h9p66637310h3/fulltext.pdf>, pp. 1-14.*
Bor-Ming Hsieh, "Loop Distribution with Multiple Exits", 1992, retrieved from <http://citeseerx.ist.psu.edu/viewdoc/summary?doi=10.1.1.36.3950>, pp. 1-11.*
Steven S. Muchnick, "Advanced Compiler Design and Implementation", 1997, Morgan Kaufmann.
Derek Bruening and Evelyn Duesterwald, "Exploring Optimal Compilation Unit Shapes for an Embedded Just-In-Time Compiler", Feedback-Directed and Dynamic Optimization (FDDO-3), 'Online!, Dec. 2000.

(Continued)

*Primary Examiner*—Tuan Q Dam
*Assistant Examiner*—Marina Lee
(74) *Attorney, Agent, or Firm*—Wenderoth, Lind & Ponack, L.L.P.

(57) ABSTRACT

A complier, program product, compilation device, communication terminal device and compilation method that enables parts of a source program having a large number of executions, or parts having a high possibility of a large number of executions, to be extracted with good precision and compiled preferentially. A loop having a multi-nested structure or a single-nested structure is searched for in a main program, and another program that is being called from within this loop is detected. Additionally, a loop having a multi-nested structure or a single-nested structure is searched for in the callee program, and the total number of nests in the loops detected so far is calculated as the loop depth. In other words, the degree of multiplicity in all of the loops forming a multi-nested structure over programs having a calling relationship is calculated as the loop depth. The loop having the greatest loop depth is included in the parts to be compiled preferentially, and only the parts determined as parts to be compiled are compiled.

7 Claims, 13 Drawing Sheets

U.S. PATENT DOCUMENTS

| | | | | |
|---|---|---|---|---|
| 6,055,371 | A * | 4/2000 | Okano | 717/160 |
| 6,088,525 | A * | 7/2000 | Peri | 717/150 |
| 6,253,373 | B1 * | 6/2001 | Peri | 717/150 |
| 6,286,135 | B1 * | 9/2001 | Santhanam | 717/146 |
| 6,341,371 | B1 * | 1/2002 | Tandri | 717/158 |
| 6,842,895 | B2 * | 1/2005 | Renard et al. | 717/160 |
| 6,988,266 | B2 * | 1/2006 | Lam et al. | 717/160 |
| 2001/0044930 | A1 * | 11/2001 | Miyata et al. | 717/9 |
| 2003/0120905 | A1 * | 6/2003 | Stotzer et al. | 712/241 |

OTHER PUBLICATIONS

Tom Way et al., "Region Formation Analysis with Demand-driven Inlining for Region-based Optimization", Parallel Architectures and Compilation Techniques, 2000, Proceedings, International Conference On Philadelphia, PA, USA, Oct. 15-19, 2000, Los Alamitos, CA, USA, IEEE Comput. Soc., US, Oct. 15, 2000, pp. 24-33.

Toshio Suganuma et al., "A Dynamic Optimization Framework for a Java Just-In-Time Compiler", OOPSLA, Object-Oriented Programming Systems, Languages and Applications, Conference Proceedings, Oct. 14, 2001, pp. 180-194.

Matthew Arnold et al., "Adaptive Optimization in the Jalapeño JVM", Sigplan Notices, Association for Computing Machinery, New York, N.Y., US, vol. 35, No. 10, Oct. 2000, pp. 47-65.

John Whaley, "Partial Method Compilation using Dynamic Profile Information", ACM Sigplan Notices, ACM, Association for Computing Machinery, New York, N.Y., US, vol. 36, No. 11, Nov. 2001, pp. 166-179.

Richard E. Hank et al., "Region-Based Compilation: Introduction, Motivation, and Initial Experience", International Journal of Parallel Programming, Plenum Press, New York, N.Y., US. vol. 25, No. 2, Apr. 1997, pp. 113-146.

* cited by examiner

FIG.2

```
public class test {
    public static void main (String args[ ] ) {
        test t;
        int i = 0,j = 0,k = 0;
        t = new test ( ) ;
        do {
            do {
                i++ ;
            } while ( i > 5 ) ;
            j++ ;
        } while ( j > 6 ) ;
        return ;
    }
}
```

COMPILER, PROGRAM PRODUCT, COMPILATION DEVICE, COMMUNICATION TERMINAL DEVICE, AND COMPILATION METHOD

BACKGROUND OF THE INVENTION

1. Field of the Invention

The present invention relates to a compiler for converting a source program written in a compiler language, which is sometimes referred to as a high-level programming language, for example C language, C++ language, Java® language, classical compiler languages such as FORTRAN and COBOL, or APL, PL/1, ADA, Smalltalk, Lisp, an assembler language, or any other type of programming language, into an object program in an intermediate language which serves as a process for converting the source program into a machine language, for example a machine language that can be executed directly by a CPU (Central Processing Unit) (note that CPU includes an MPU (Micro Processing Unit)). The present invention also relates to a program product based on this compiler, a compilation device for performing compilation, a communication terminal device comprising the compilation device, and a compilation method for performing compilation. Note that the aforementioned "Java®" is a registered trademark of the U.S. company Sun Microsystems. In this specification, the symbol ® indicates a registered trademark.

2. Description of the Related Art

The device disclosed in Japanese Unexamined Patent Publication H6-202875, for example, is known as a conventional partial compiler. The objects of the conventional partial compiler disclosed in Japanese Unexamined Patent Publication H6-202875 are to enable determination of the necessity of in-line expansion for each function call, to perform in-line expansion corresponding to an execution image, and to enable practical and efficient in-line expansion. In this prior art, to achieve these objects, control flow weighting means estimates the number of times each partial control flow constituting a control flow has been executed on the basis of an analysis result of control flow analyzing means, and weights each partial control flow based on the number of executions. Further, object generating means determines the necessity of in-line expansion for a function called by each function call with reference to the result of the weighting performed by the control flow weighting means, and generate an object program reflecting this determination.

When calculating the number of executions to determine the compilation part, and when a subprogram executed within the program that is called from another program has a so-called multi-nested loop structure, the conventional partial compiler described in Japanese Unexamined Patent Publication H6-202875 calculates the number of executions in consideration of the degree of multi-nesting in the loop, or in other words the loop depth. In the case of a subprogram that is executed by a caller program and also has a multi-nested loop structure, however, this partial compiler does not consider the degree of multi-nesting in the loop within the read source program.

Hence the conventional partial compiler described in Japanese Unexamined Patent Publication H6-202875 is problematic in that it considers the depth of the loop executed at the call source and the depth of the loop executed at the call destination together, and is therefore unable to compile parts having a large total number of executions preferentially. As a result, this prior art is unable to optimize improvements in the program execution speed and economizing on the storage capacity of the memory that is used to store the programs.

Another problem in the prior art described in Japanese Unexamined Patent Publication H6-202875 is that in a case where a loop with a double-nested structure exists, for example, when the return destination of each loop has the same address and different labels (in other words, a symbol indicating the address) are not attached, a judgment cannot be made as to whether a return destination is a return from a point on a single loop and a final return, or a return destination of a loop having a double-nested structure. Hence the prior art is unable to calculate the loop depth or number of executions accurately. In other words, here too the prior art is unable to extract parts with a large number of executions accurately and compile these parts preferentially, and hence improvements in execution speed and economizing on the memory regions to be used cannot be optimized.

SUMMARY OF THE INVENTION

The present invention has been designed in consideration of these problems, and it is an object thereof to provide a compiler, program product, compilation device, communication terminal device, and compilation method which enable parts of a source program having a large number of executions, or parts with a high possibility of having a large number of executions, to be extracted accurately and compiled preferentially, thereby enabling improvements in program execution speed and economizing on the storage capacity of the memory that is used to store the programs to be optimized with good precision.

To solve the aforementioned problems and achieve the aforementioned object, one aspect of the present invention is a compiler for converting a source program into an object program, this compiler causing a computer to execute: a multi-nested structure detection procedure for detecting a multi-nested structure included in the source program; a return destination address detection procedure for detecting a return destination address in each unit loop constituting the multi-nested structure; an address overlap determination procedure for determining whether or not overlapping return destination addresses sharing the same address are present among the plurality of return destination addresses detected in the return destination address detection procedure; and a dividing procedure which, when the address overlap determination procedure determines the presence of overlapping return destination addresses, converts the source program into an object program in which the overlapping return destination addresses differ from each other.

According to the compiler, program product, compilation device, communication terminal device, and compilation method of the present invention, parts of the source program having a large number of executions, or parts having a high possibility of a large number of executions, can be extracted with good precision and compiled. As a result, improvements in the execution speed of a program and economizing on the storage capacity of the memory used to store the program can be optimized with good precision.

BRIEF DESCRIPTION OF THE DRAWINGS

FIG. 2 is a view showing an example of a Java® program code developed by the development environment in FIG. 1;

DESCRIPTION OF THE PREFERRED EMBODIMENTS

Embodiments of the present invention will now be described in detail with reference to the drawings.

First Embodiment

Figure 1:
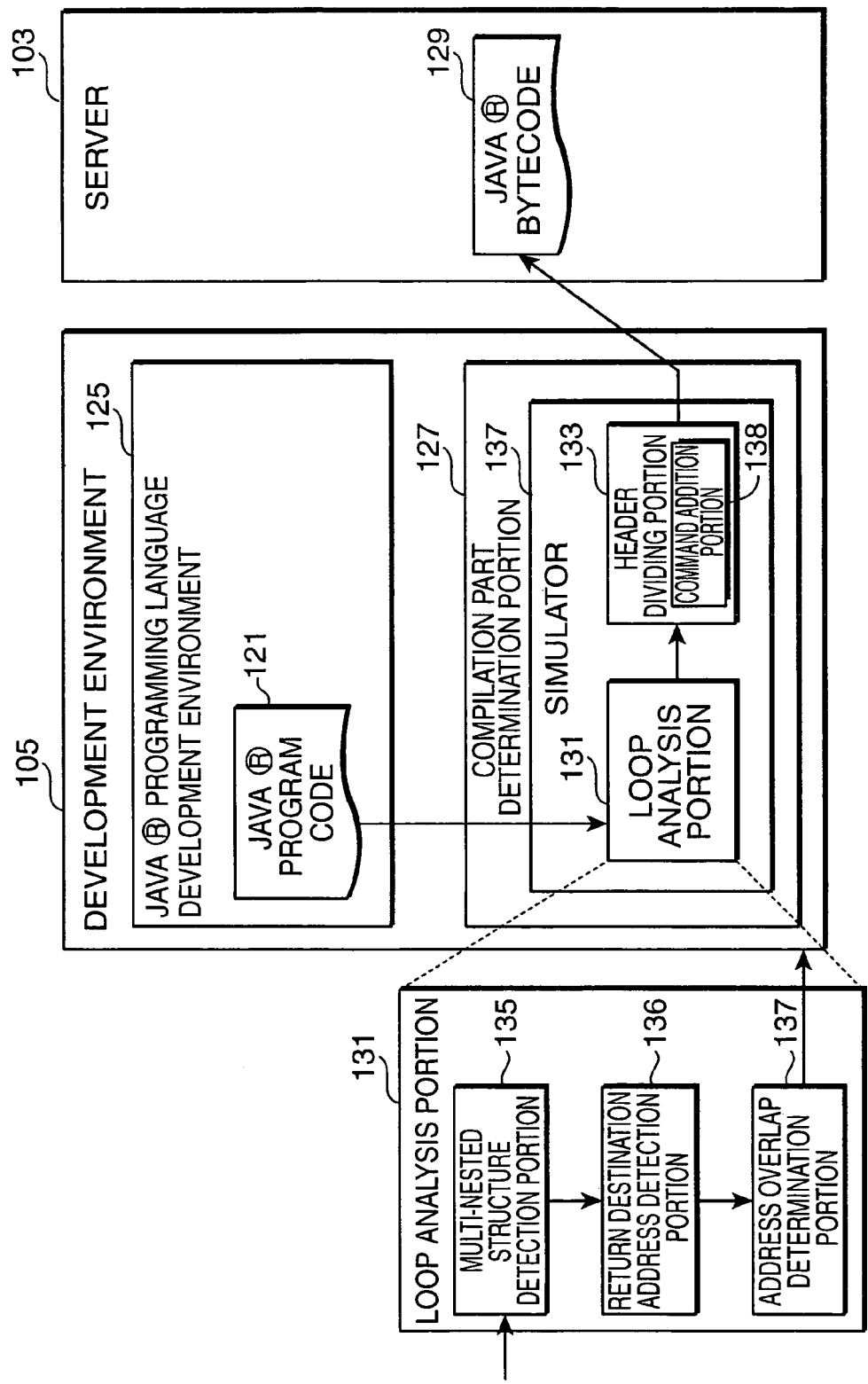
FIG. 1 is a schematic diagram of a development environment for executing a compiler according to a first embodiment of the present invention.

FIG. 1 shows the schematic constitution of the main parts of a development environment for a compiler according to an embodiment of the present invention. The development environment 105 also corresponds to the development environment for implementing a recording medium, a compilation device, and a compilation method according to an embodiment of the present invention. The development environment 105 comprises in a part of its interior a Java® programming language development environment 125 serving as an environment for developing a Java® language program, for example.

In FIG. 1, the Java® programming language development environment 125 is shown as an example, but the programming language to be used is not limited to Java® programming language, and may be any compiler language known as a so-called high-level programming language. For example, any source program written in C language, C++ language, Java® language, classical compiler languages such as FORTRAN and COBOL, or APL, PL/1, ADA, Smalltalk, Lisp, a so-called assembler language, or any other type of programming language will not break down. Further, the development environment 105 may comprise development environments using a plurality of languages, or may simply comprise a development environment for a single language.

A Java® program code 121 is developed by the Java® programming language development environment 125. The Java® program code 121 corresponds to an embodiment of the source program according to the present invention. FIG. 2 shows an example of a Java® program code. In the example in FIG. 2, the Java® program code 121 comprises two "do-while" loops constituting a double nesting. In other words, the Java® program code 121 has a double-nested structure.

Note that in this specification, "multi-nested structure" is referred to simply as "multiple loop" where appropriate. Further, single loops and multi-nested structures, or in other words multiple loops, are referred to as "loop structures" or "loops" where appropriate. To differentiate between the individual loops constituting a multiple loop, these loops are referred to as "unit loops". A single loop is also referred to as a "single-nested structure".

This type of loop structure is subjected to analysis by a compilation part determination portion 127. The development environment 105 comprises a computer not shown in the drawing, and when the computer executes the compiler according to an embodiment of the present invention, the functions of the compilation part determination portion 127 are realized. A simulator 137 of the compilation part determination portion 127 simulates an execution of the Java® program code 121 shown as an example in FIG. 2, and comprises a loop analysis portion 131 and a header dividing portion 133.

By analyzing the loop, the loop analysis portion 131 detects overlapping return destination addresses from among the return destinations addresses of the multiple loop. For this purpose, the loop analysis portion 131 comprises a multi-nested structure detection portion 135, a return destination address detection portion 136, and an address overlap determination portion 137. The header dividing portion 133 divides detected overlapping return destination addresses, converts the Java® program code 121 into a Java® bytecode 129 in which the overlapping return destination addresses are divided, and outputs this Java® bytecode 129. For this purpose, the header dividing portion 133 comprises a command addition portion 138. The Java® bytecode 129 corresponds to an embodiment of the object program of the present invention.

Figure 3B:
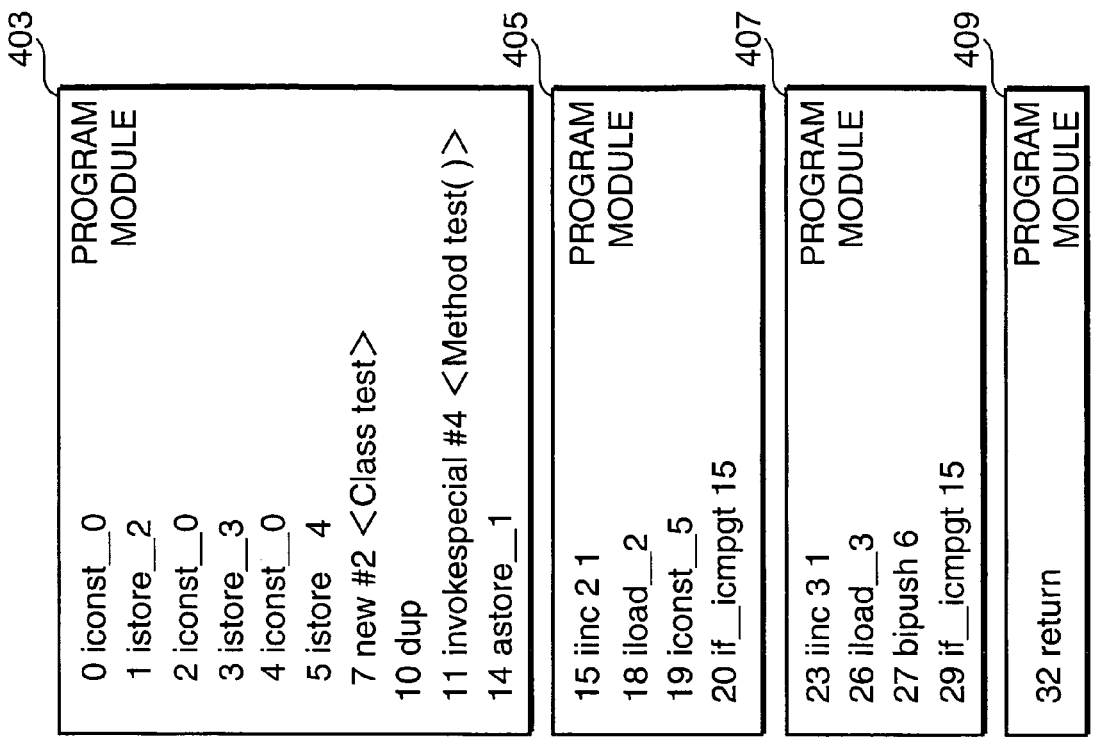
FIG. 3 is a view showing an example of a Java® bytecode in which the return destinations of two loops overlap.
Figure 3A:
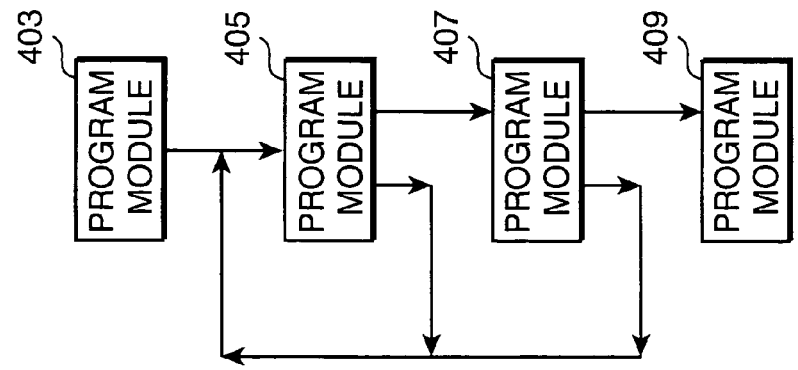

FIG. 3 is a view illustrating as a comparative example a case in which the compilation part determination portion 127 outputs the Java® bytecode 129 without dividing the overlapping return destination addresses. The Java® bytecode 129 shown as an example in FIG. 3 comprises program modules 403, 405, 407, and 409. FIG. 3A is a block flowchart showing an example of the processing flow of each module, and FIG. 3B shows an example of the program written in each module. In the Java® bytecode 129, the return destinations of the two loops both correspond to the command "15 iinc 2 1" at the top of the program module 405. In other words, the return destination addresses of the double loop overlap.

During partial compilation of the multiple loop included in the Java® bytecode 129, when the two return destination addresses of the double loop are identical in this manner, it is impossible to determine whether the loop is a single loop including a return from a mid-point, or a double loop. In other words, it is impossible to determine whether this is a case in which the loop is a single loop which iterates the program module 405 and the program module 407 repeatedly, but under certain conditions, executes the program module 405 alone to complete a single loop, or whether the loop is a double loop comprising an inside loop which iterates the program module 405 alone, and in addition to the inside loop, a loop which iterates the program module 407.

Figure 4B:
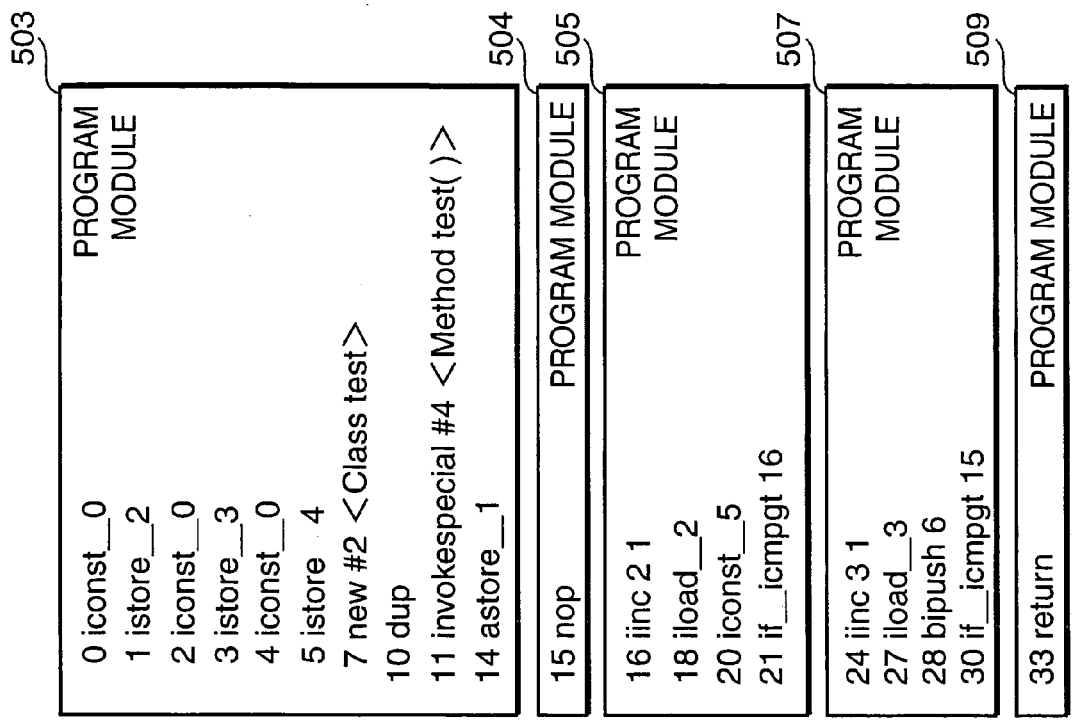
FIG. 4 is a view showing an example of a Java® bytecode in which the return destinations of the two loops are divided.

Hence the loop analysis portion 131 detects the overlapping return destination addresses of such a multiple loop, and the header dividing portion 133 divides the detected overlapping return destination addresses. More specifically, as shown using a program module 504 in FIG. 4 as an example, the header dividing portion 133 inserts "15 nop" to divide the return address of the inside loop and the return address of the outside loop. In FIG. 4, program modules 503, 505, 507, and 509 are identical in content to the program modules 403, 405, 407, and 409 shown in FIG. 3 except for the fact that the addresses are displaced by the insertion of the module 504.

Figure 4A:
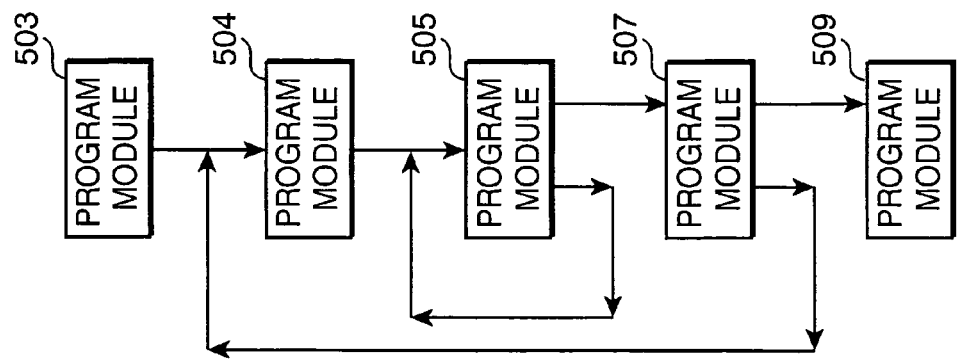

When the two return destinations of a double loop are identical in this manner, the fact that the loop is a double loop can be clarified as shown in the structure of the block flowchart in FIG. 4A by inserting a command such as the aforementioned "nop (No Operation)", for example, that is meaningless in terms of processing (to be referred to as an "unnecessary command" in this specification) in order to divide the return destination addresses. The Java® bytecode 129, in which the overlapping return addresses of the double loop have been divided by the header dividing portion 133 in the manner described above, is then transferred from the development environment 105 to a server 103. The server 103 stores the transferred Java® bytecode 129 in preparation for a transmission request from a client terminal device.

This constitution, in which the Java® bytecode 129 is transferred to and stored in the server 103, is merely an example, however, and not absolutely necessary. In other examples, the development environment 105 and server 103 may be different storage portions of the same device, the same storage portion of the same device, or may be constituted in another manner.

Figure 5:
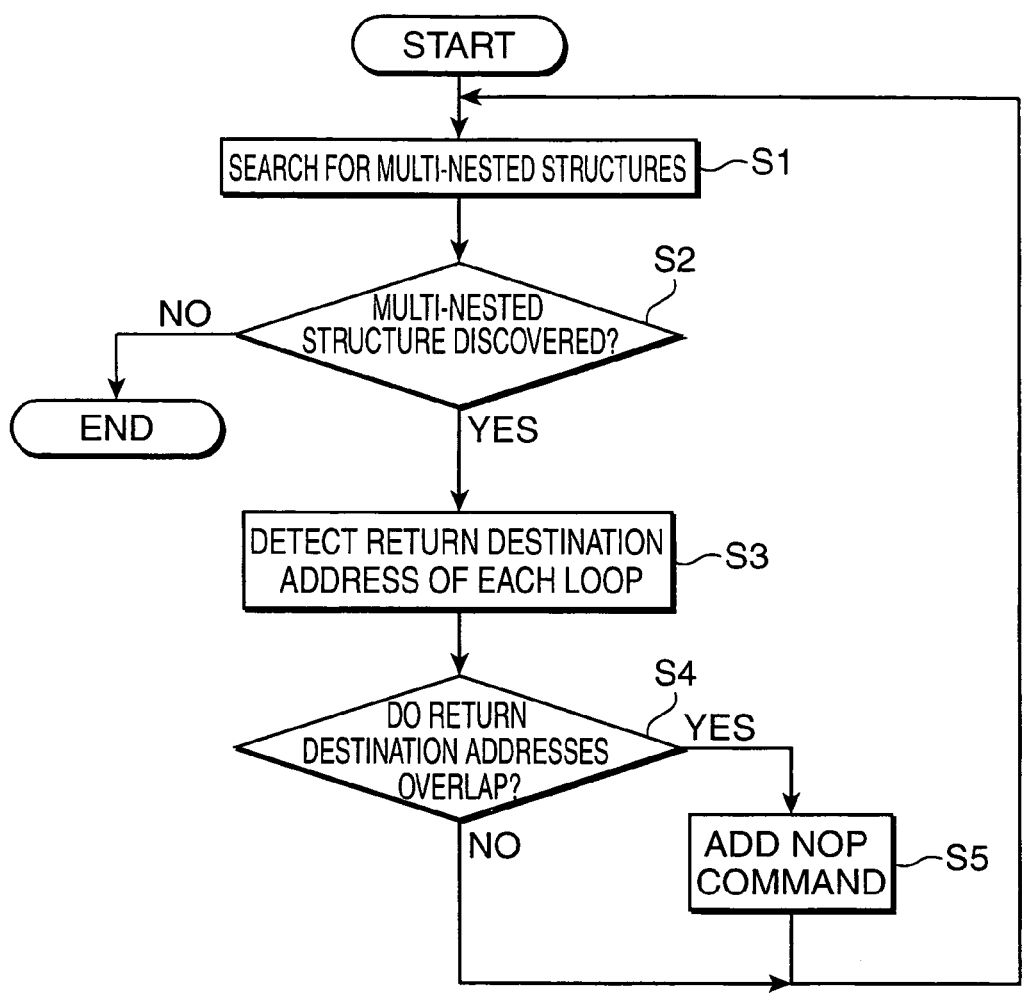
FIG. 5 is a flowchart showing a procedure for dividing overlapping return destinations of a loop.

The procedure performed by the compilation part determination portion 127 will now be described in further detail. FIG. 5 is a flowchart showing the procedure that is executed by the compilation part determination portion 127. The compilation part determination portion 127 converts the Java® program code 121 into the Java® bytecode 129 while executing the processing of steps S1 through S5. When the compilation part determination portion 127 begins this processing, first the multi-nested structure detection portion 135 searches for multi-nested structures within the Java® program code 121 (S1). If the multi-nested structure detection portion 135 detects a multi-nested structure (Yes in S2), the return destination address detection portion 136 detects the return destination addresses of each of the unit loops constituting the detected multi-nested structure (S3).

If the return destination addresses overlap (Yes in S4), the command addition portion 138 of the header dividing portion 133 adds a nop command to one of the overlapping return destination addresses, thus dividing the overlapping return destination addresses (S5). Typically, when the return destination addresses of each unit loop of an N (where N≧2) nested structure overlap, the overlap can be eliminated by inserting a nop command into the individual return destinations of the inside N-1 unit loop. Thereafter, the processing returns to the step S1. If, on the other hand, the return destination addresses do not overlap (No in S4), the processing returns to the step S1 immediately. The compilation part determination portion 127 iterates the processing of the steps S1 through S5 until the multi-nested structure detection portion 135 no longer detects any multi-nested structures, and when multi-nested structures are no longer detected (No in S2), the processing ends.

Second Embodiment

Figure 6:
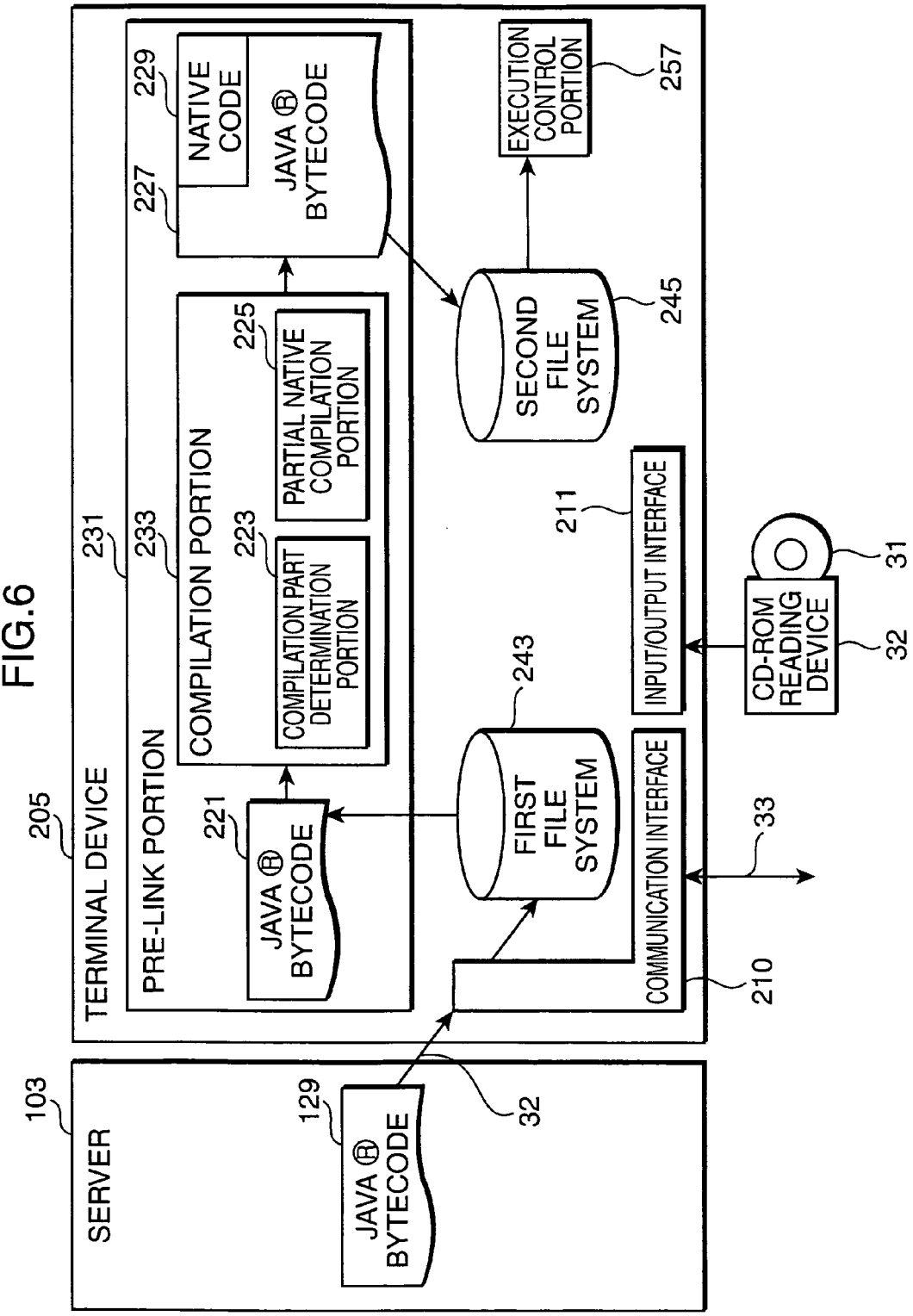
FIG. 6 is a block diagram showing the constitution of a terminal device according to a second embodiment of the present invention.

FIG. 6 is a block diagram showing an outline of the main parts of a terminal device for executing the compiler according to an embodiment of the present invention. The terminal device 205 also corresponds to the compilation device and communication terminal device according to an embodiment of the present invention. Furthermore, the terminal device 205 corresponds to the recording medium and a device for implementing the compilation method according to an embodiment of the present invention.

The terminal device 205 comprises a computer not shown in the drawing. By executing the compiler according to an embodiment of the present invention, the computer realizes the functions of a pre-link portion 231 provided in the terminal device 205. The compiler for realizing the functions of the pre-link portion 231 may be supplied via a recording medium 31 such as ROM (Read Only Memory), a flexible disk, or a CD-ROM, or may be supplied via a transmission medium 33 such as a telephone line or network. In FIG. 6, a CD-ROM is illustrated as the recording medium 31. The compiler that is recorded on the CD-ROM can be read by connecting a CD-ROM reading device 32 to an input/output interface 211, and may also be stored in a storage medium such as a hard disk or RAM (Random Access Memory) provided in the computer not shown in the drawing.

When the compiler is supplied with the recording medium 31 in the form of ROM, by loading the ROM in the computer, the computer becomes able to execute the processing of the pre-link portion 231 in accordance with the compiler. A compiler that is supplied through the transmission medium 33 is received through a communication interface 210 and stored in a storage medium, not shown in the drawing, such as a hard disk or RAM, for example. The transmission medium 33 is not limited to a wired transmission medium, and may be a wireless transmission medium. Note that the compiler for realizing the functions of the compilation part determination portion 127 (FIG. 1) may also be supplied to a computer, not shown in the drawing, which is provided in the development environment 201, although description thereof in the first embodiment has been omitted.

The terminal device 205 reads the Java® bytecode 129, in which the return destination addresses of the multiple loop have been divided, from the server 103 into a first file system 243 through the network 32 and communication interface 210. Having been read into the first file system 243, the Java® bytecode 221 is read into the pre-link portion 231 of the terminal device 205, where the parts to be compiled are determined by a compilation part determination portion 223 provided in a compilation portion 233.

The compilation part determination portion 223 considers the call relationships between the plurality of programs, and considers the loop depth of the call command in the caller program and the loop depth of the callee program together, to determine the deepest loop as the loop (command) with the highest possibility of being executed the highest number of times. The compilation part determination portion 223 also determines the deepest loop (command) as the part on which partial compilation priority is to be placed.

Here, "loop depth" signifies the degree of multi-nesting in the multi-nested structure or single-nested structure of a loop. For example, the loop depth of a single-nested structure is 1, and the loop depth of a double-nested structure is 2. In general, a processing part or command which is executed iteratively (to be referred to in this specification as an "iterative execution part") may be detected instead of detecting loops. This is the reason why "(command)" is appended to loop. The number of executions of an iterative execution part corresponds to the loop depth.

Figure 7:
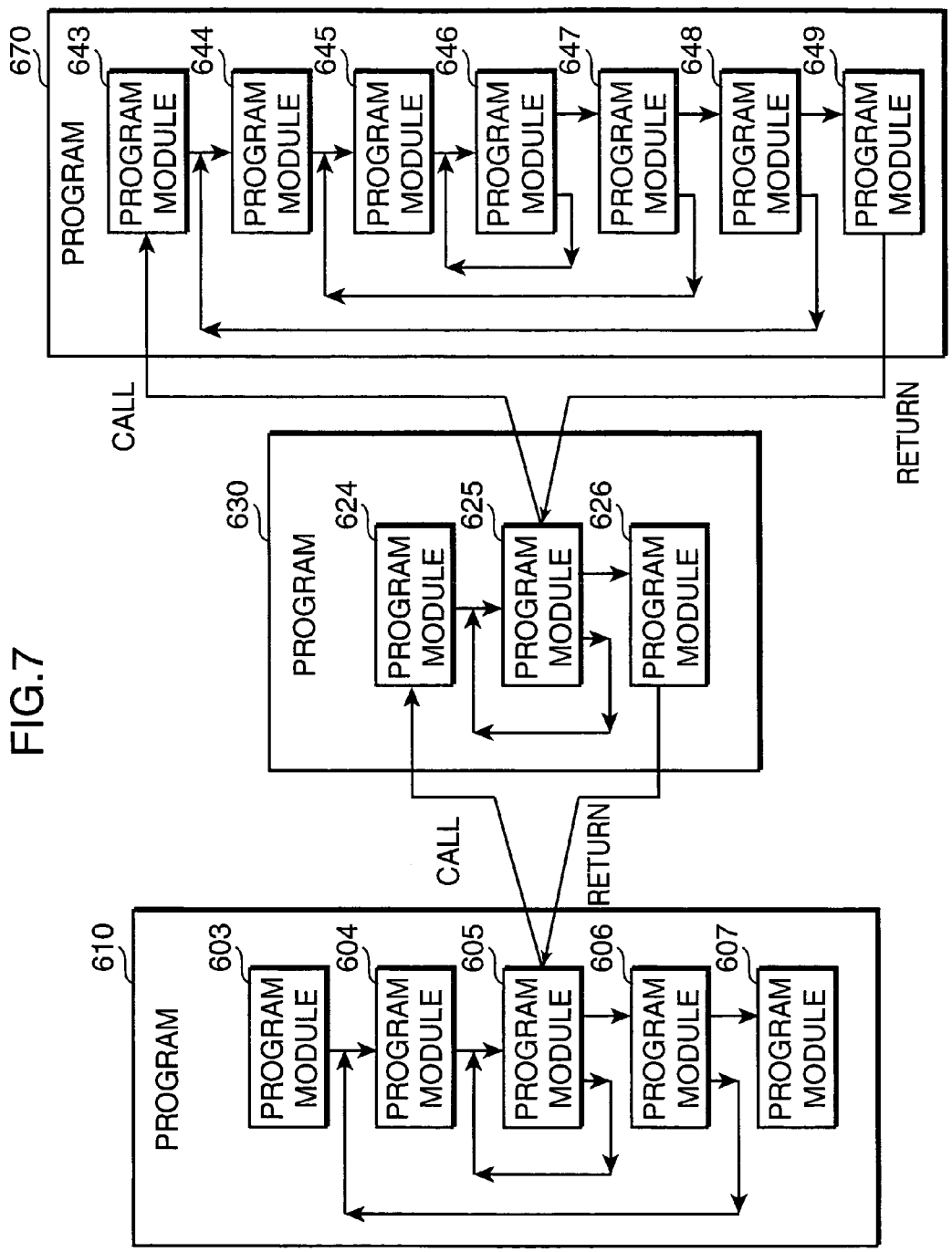
FIG. 7 is a view showing an example of a Java® bytecode for performing calling in sequence among three programs.

As shown in FIG. 7, for example, it is assumed that calling is performed in sequence by three programs, a program 610, a program 630, and a program 670. It is also assumed that the program 610 includes program modules 603 through 607, the program 630 includes program modules 624 through 626, and the program 670 includes program modules 643 through 649.

Further, it is assumed that the program 630 is called from the program module 605 of the program 610, and that the program 670 is called from the program module 625 of the program 630.

The program module 605 is within a loop having a depth of 2 in the program 610, the program module 625 is within a loop having a depth of 1 in the program 630, and the program module 646 is within a loop having a depth of 3 in the program 670. Hence, when the depth of the loop in the program 670 alone is considered, then the depth of the program module 646 is determined to be "3". However, when the loop depth is determined in total, taking into consideration the call relationships between all of the programs, this depth is "2+1+3=6".

This is merely one example, but likewise in relation to all other programs and program modules, when the loop depth is determined in total, taking into consideration the call relationships of all programs, the loop (command) with the highest possibility of a large number of executions can be detected more accurately, and by partially compiling this part, the execution speed can be maximized more accurately.

The multiple loop return destination addresses of the Java® bytecode 221 are divided by the header dividing portion 133 in the compilation part determination portion 127 of the development environment 105. Hence, in the case of a double loop such as that shown as an example in FIGS. 3 and 4, the double loop can be detected accurately, and thus the loop (command) with the highest number of executions can be determined with precision. Accordingly, the part to be compiled preferentially can be determined with good precision. As a result, an accurate determination can be made of the part that is capable of raising the execution speed to the greatest extent in accordance with the allowable limit of the run time memory capacity, or in other words the allowable limit of the memory capacity of a second file system 245 provided in the terminal device 205 in the example in FIG. 6, and this part can be determined as the part to be compiled.

A partial native compilation portion 225 provided in the compilation portion 233 compiles the part to be compiled, determined by the compilation part determination portion 223. When determining the compilation part, the compilation part determination portion 223 gives priority to the deepest loops when the loop depth is considered in total as described above, and performs this determination in consideration of the run time memory capacity such that pre-compilation can be performed for the greatest number of commands in accordance with the allowable run time memory capacity. In so doing, the execution speed can be raised to the greatest extent possible in accordance with the allowable run time memory capacity.

Due to limits on the run time memory capacity, it is not always possible to pre-compile all commands, and hence a native code 229 part, which has completed pre-compilation, and a part remaining in the Java® bytecode 227 coexist in the program following pre-compilation. This run time program, in which the native code 229 part which has completed pre-compilation and the part remaining in the Java® bytecode 227 coexist is stored in the second file system 245. The first file system 243 and second file system 245 may be the same body or separate bodies.

The run time program stored in the second file system 245 is executed by an execution control portion 257. Since the parts with the greatest loop depth are pre-compiled preferentially in accordance with the allowable run time memory capacity, the maximum execution speed can be improved by the run time program.

As described above, when a double loop such as that shown as an example in FIGS. 3 and 4 exists, the header dividing portion 133 of the compilation part determination portion 127 divides the return destination addresses of the double loop, and hence the double loop is detected accurately and the loop (command) with the greatest number of executions is determined precisely, enabling the compilation part determination portion 223 to determine the parts to be compiled preferentially. However, as noted above, analysis of the return destination addresses is performed by inserting an unnecessary command which is meaningless in terms of processing such as a nop command. Since this command is meaningless in terms of processing, it has no adverse effect on the processing content. However, the command unnecessarily occupies a region of the memory. Further, when the execution control portion 257 executes a program, the command is decoded, and hence time is wasted until it is determined that the command is a nop command, for example. By having the partial native compilation portion 225 determine whether or not a loop is a double loop, pre-compilation can be executed after deleting such additional, unnecessary commands.

Figure 8:
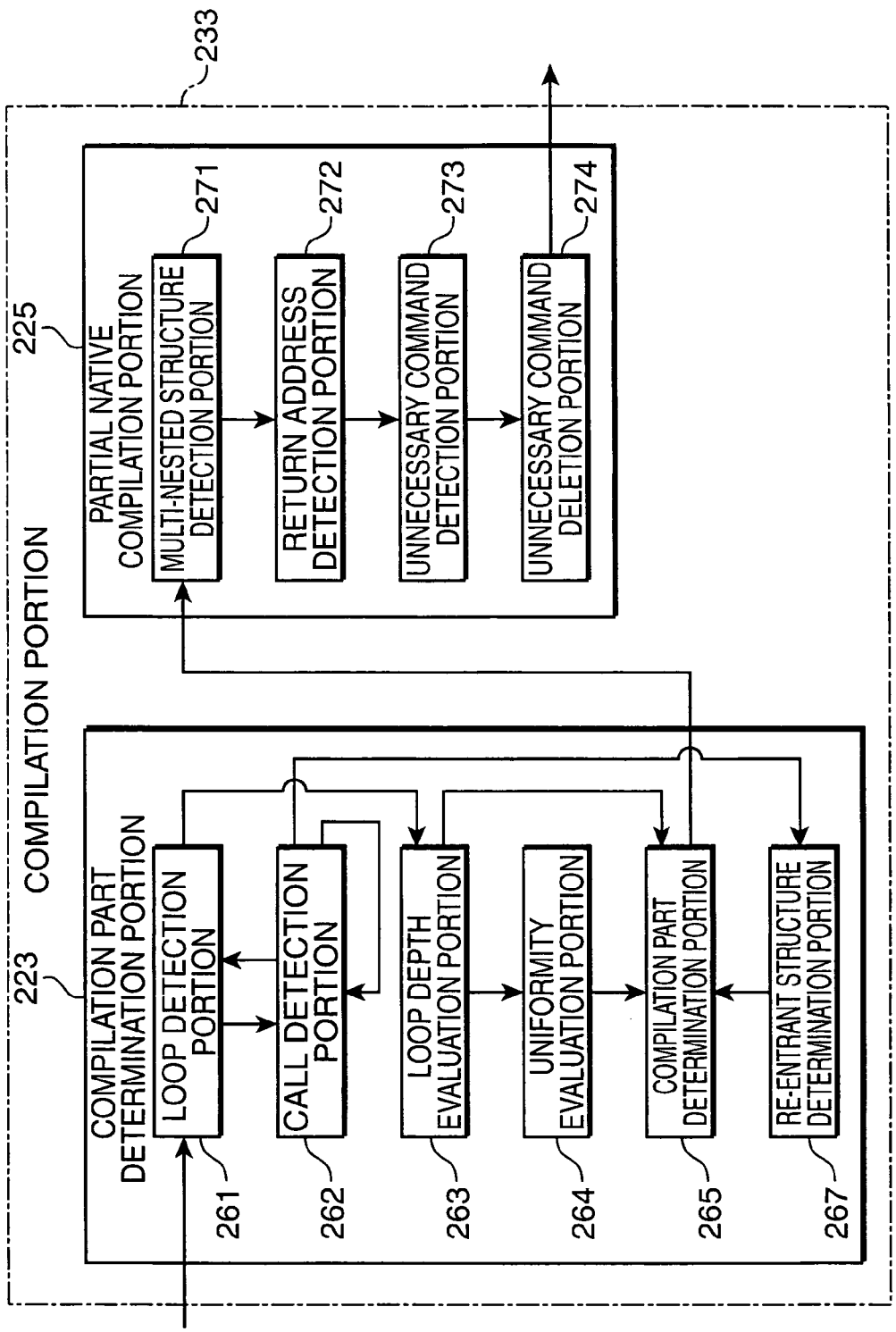
FIG. 8 is a block diagram showing the constitution of a compilation portion in FIG. 6.

Next, the constitution and an operating sequence of the compilation portion 233 will be described in detail. FIG. 8 is a block diagram showing the constitution of the compilation part determination portion 223 and partial native compilation portion 225 provided in the compilation portion 233. The compilation part determination portion 223 comprises a loop detection portion 261, a call detection portion 262, a loop depth evaluation portion 263, a uniformity evaluation portion 264, a compilation part determination portion 265, and a re-entrant structure determination portion 267. The partial native compilation portion 225 comprises a multi-nested structure detection portion 271, a return address detection portion 272, an unnecessary command detection portion 273, and an unnecessary command deletion portion 274.

Figure 9:
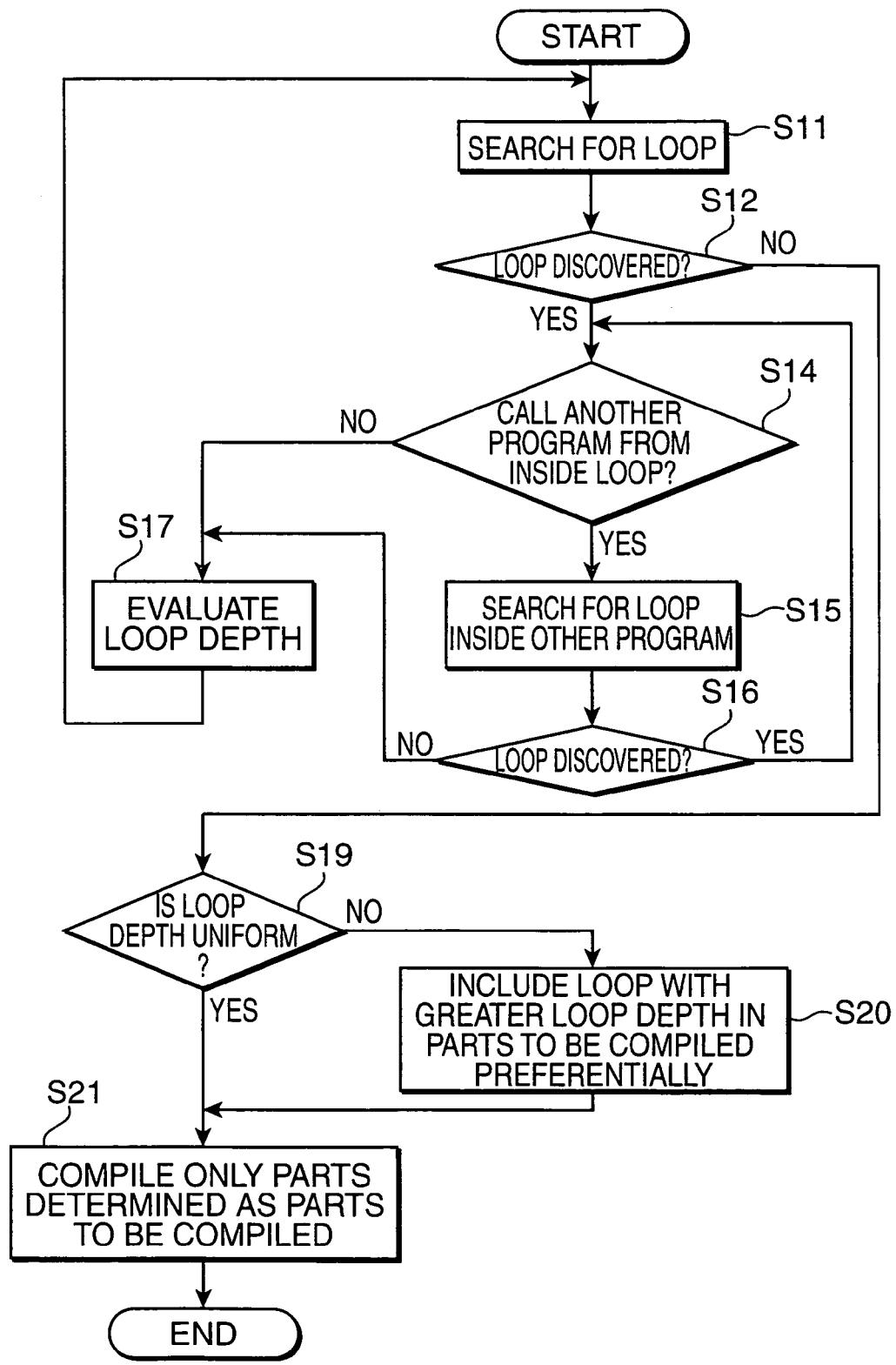
FIG. 9 is a flowchart showing a procedure performed by the compilation portion of FIG. 8.

FIG. 9 is a flowchart showing a procedure executed by the compilation part determination portion 223 and the partial native compilation portion 225. For ease of explanation, it is assumed that the Java® bytecode 221 having the three programs 610, 630, and 670 of FIG. 7 is subjected to processing by the compilation part determination portion 223 and the partial native compilation portion 225. When the compilation part determination portion 223 begins the processing, first the loop detection portion 261 searches for a loop having a multi-nested structure or a single-nested structure within the main program included in the Java® byte code 129, or in other words the program 610 in FIG. 7 (S11).

When a loop included in the program 610 is detected by the loop detection portion 261 (Yes in S12), the call detection portion 262 detects another program that is being called from within the detected loop (S14). When the callee program, or in other words the program 630, is detected (Yes in S14), the loop detection portion 261 searches for a loop having a multi-nested structure or a single-nested structure within the program 630 (S15). Note that the loop detection portion 261 corresponds to an embodiment of both the first and second loop detection means of the present invention.

When the loop detection portion 261 detects a loop included in the program 630 (Yes in S16), the call detection portion 262 searches for a further program that is being called from within the detected loop (S14). When the callee program, or in other words the program 670, is detected (Yes in S14), the loop detection portion 261 searches for a loop having a multi-nested structure or a single-nested structure within the program 670 (S15).

When the loop detection portion 261 detects a loop included in the program 670 (Yes in S16), the call detection portion 262 searches for a further program that is being called from within the detected loop (S14). Since no callee program is detected (No in S14), the loop depth evaluation portion 263 calculates the total number of nests within the loops detected by the loop detection portion 261 up to this point, i.e. 2+1+3=6, as the loop depth. In other words, the loop depth evaluation portion 263 calculates as the loop depth the degree of multiplicity in all of the loops forming a multi-nested structure over the call-related programs 610, 630, and 670 (S17).

The loop detection portion 261 searches for further loops in the program 610 (S11). If the loop detection portion 261 does not detect any new loops (No in S12), the uniformity evaluation portion 264 preferably evaluates the degree of uniformity among the loop depths (S19). When the loop depth evaluation portion 263 calculates a plurality of loop depths, the uniformity evaluation portion 264 determines whether or not the plurality of loop depths possesses uniformity when compared with a predetermined reference. For example, the uniformity evaluation portion 264 determines that the plurality of depths are uniform when all of the depths are identical, and determines non-uniformity when a non-identical loop depth exists. Alternatively, the uniformity evaluation portion 264 determines uniformity when all of the plurality of loop depths are within a set reference range, and determines non-uniformity when a loop depth which falls outside of the reference range exists. When the loop depth evaluation portion 263 calculates only a single loop depth, the uniformity evaluation portion 264 determines that the loop depth is not uniform.

When the uniformity evaluation portion 264 determines that the loop depths are not uniform (No in S19), the compilation part determination portion 265 includes the loops having the greatest loop depth in the parts to be compiled preferentially (S20). For example, the compilation part determination portion 265 includes as many loops as possible, within the allowable memory capacity range allocated in the second file system 245, in the parts to be compiled preferentially in sequence from the part with the greatest loop depth. As another example, the compilation part determination portion 265 includes only the loop having the greatest loop depth, or a set number of loops in sequence from the loop with the greatest loop depth, in the parts to be compiled. Alternatively, the compilation part determination portion 265 includes loops exceeding a set loop depth threshold in the parts to be compiled.

When the processing of the compilation part determination portion 265 is complete (S20), or when the uniformity evaluation portion 264 determines that the loop depth is uniform (Yes in S19), the partial native compilation portion 225 compiles only the parts determined by the compilation part determination portion 265 as parts to be compiled, and thus generates the Java® bytecode 227 comprising the native code 229 (S21).

Thus the loop having the greatest total number of nests within the Java® bytecode 221, including the multi-nested structure constituted among the call-related plurality of programs 610, 630, 670, is compiled preferentially. In so doing, the parts of the Java® bytecode 221 having the highest possibility of a large number of executions are extracted and compiled with precision. As a result, optimization of improvements in the program execution speed and economizing on the memory regions of the second file system 245 can be performed with great precision.

In the step S20, the compilation part determination portion 265 may determine that there are no parts to be compiled when the maximum value of the loop depth does not meet a predetermined threshold. In so doing, wasteful compilation of parts which contribute little to improvements in execution speed, and hence wasteful use of memory regions in the second file system 245, can be avoided.

The compilation part determination portion 265 may also determine that there are no parts to be compiled when the loop depth evaluation portion 263 determines that the loop depths are uniform (Yes in S19). In so doing, compilation of a large number of parts having an approximately equal contribution to improvements in execution speed, and hence impairment of the effective use of the memory regions in the second file system 245, can be avoided.

When the compilation part determination portion 265 determines that there are no parts to be compiled, the partial native compilation portion 225 outputs the Java® bytecode 221, which serves as the source program subjected to processing, as the Java® bytecode 227, which serves as the object program following processing, without performing compilation. In this case, it is preferable that the parts of the Java® bytecode 227 having a high execution frequency be extracted, and that the extracted parts be partially compiled, while the bytecode 227 is supplied for execution by the execution control portion 257. In other words, the Java® bytecode 227 that was not partially compiled prior to execution is preferably provided for so-called JIT (Just In Time) processing. The Java® bytecode 227 that was partially compiled prior to execution may also be subjected to the JIT processing by the execution control portion 257 so that further preferred parts are compiled. A constitutional example of the execution control portion 257 that is used to execute JIT will be described below.

In FIG. 9, the loop detection portion 261 may detect iterative execution parts, which are parts that are executed iteratively, instead of detecting loops. Iterative execution parts include loops. In this case, the loop depth evaluation portion 263 calculates the sum of the number of executions of the iterative execution parts in stead of the total loop depth, or in other words the degree of multi-nesting in the loops. In so doing, the parts of the Java® bytecode 221 that have a large number of executions can be extracted and compiled with greater precision. As a result, improvements in the program execution speed and economizing on the memory regions of the second file system 245 can be optimized with great precision.

Figure 10:
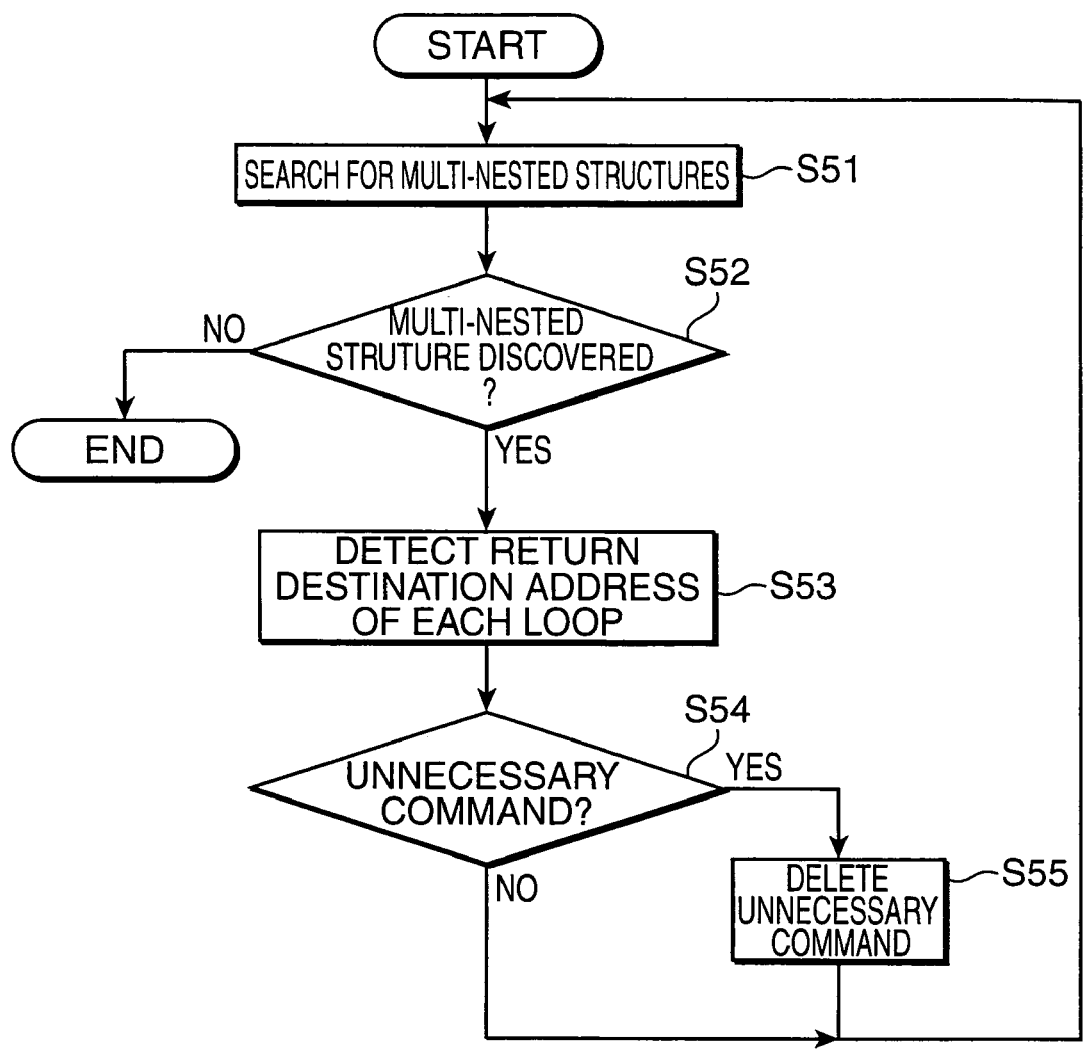
FIG. 10 is a flowchart showing a procedure performed by a partial native compilation portion in FIG. 8.

FIG. 10 is a flowchart showing a preferred procedure executed by the partial native compilation portion 225 before the step S21 or in parallel to the step S21. The partial native compilation portion 225 converts the Java® bytecode 221 into the Java® bytecode 227, typically including the native code 229, while executing the processing of steps S51 through S55, for example. When the partial native compilation portion 225 begins the processing, first the multi-nested structure detection portion 271 searches for multi-nested structures within the Java® bytecode 221 (S51). If the multi-nested structure detection portion 271 detects a multi-nested structure (Yes in S52), the return destination address detection portion 272 detects the return destination addresses of each unit loop constituting the detected multi-nest structure (S53).

Next, the unnecessary command detection portion 273 determines whether or not an unnecessary command is included in the detected return destination addresses (S54). When the unnecessary command detection portion 273 detects a return destination address comprising an unnecessary command (Yes in S54), the unnecessary command deletion portion 274 deletes the unnecessary command from the detected return destination address (S55). Thereafter, processing returns to the step S51. If a return destination address comprising an unnecessary command is not detected (No in S54), processing returns immediately to the step S51. The partial native compilation portion 225 iterates the processing of the steps S51 through S55 until no more multi-nested structures are detected by the multi-nested structure detection portion 271, and when no more multi-nested structures are detected (No in S52), the processing of FIG. 10 for deleting the unnecessary command ends. As stated above, the partial native compilation portion 225 preferentially compiles the parts that the compilation part determination portion has determined to be compiled (S21). The partial native compilation portion 225 ends the compilation processing of the step S21 at the time that the memory regions allocated in the second file system 245 causes overflow, for example.

Figure 11:
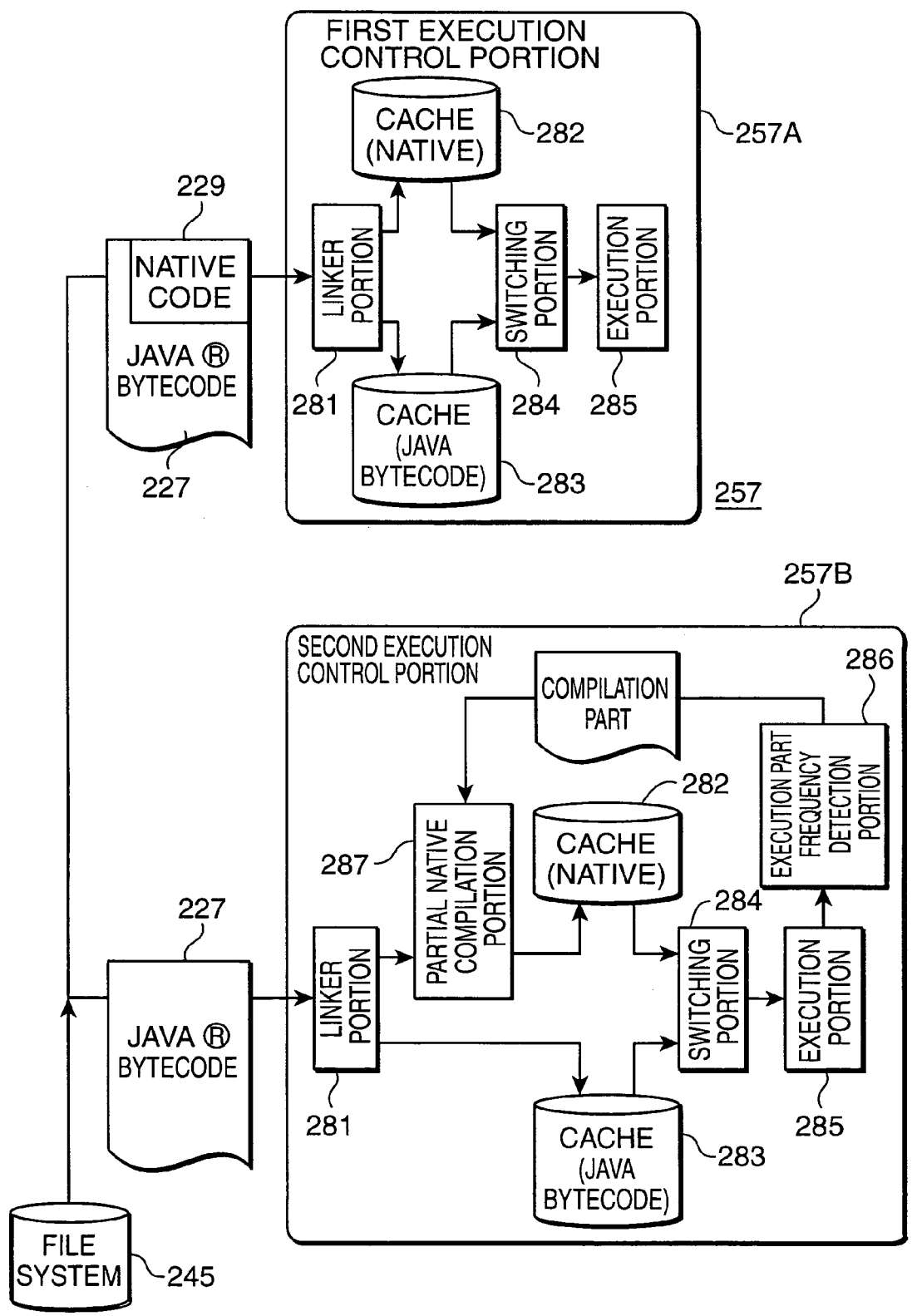
FIG. 11 is a block diagram showing the constitution of an execution control portion in FIG. 6.

FIG. 11 is a block diagram showing a constitutional example of the execution control portion 257. In the example in FIG. 11, the execution control portion 257 comprises a first execution control portion 257A and a second execution control portion 257B. When the Java® bytecode 227 that is read from the second file system 245 includes the native code 229, the Java® bytecode 227 is executed by the first execution control portion 257A. If the Java® bytecode 227 does not include the native code 229, then the Java® bytecode 227 is executed by the second execution control portion 257B. The second execution control portion 257B is used to execute so-called JIT.

The Java® bytecode 227 including the native code 229 that is inputted into the first execution control portion 257A is subjected to link processing by a linker portion 281, whereupon the native code 229 part is stored in a cache 282, and the Java® bytecode 227 part is stored in a cache 283. As the execution processing progresses, the native code 229 and Java® bytecode 227 are selected by a switching portion 284, whereupon the selected part is executed by an execution portion 285. When all of the Java® bytecode 227 has been replaced by native code 229, or in other words when all parts of the Java® bytecode 221 have been compiled by the compilation portion 233, then the program is executed by the first execution control portion 257A.

The second execution control portion 257B comprises an execution part frequency detection portion 286 and a partial native compilation portion 287 in addition to the constitution of the first execution control portion 257A. The execution part frequency detection portion 286 detects high frequency execution parts, which are parts of the program that are executed at a high frequency exceeding a set reference, while the Java® bytecode 227 not including the native code 229 is initially executed by the execution portion 285. The partial native compilation portion 287 compiles the high frequency execution parts detected by the execution part frequency detection portion 286. As a result, the Java® bytecode 227, which has come to include the native code 229, is executed by the execution portion 285 via the caches 282, 283 and the switching portion 284 similarly to the first execution control portion 257A.

Once execution by the execution control portion 257B is complete, the Java® bytecode 227 now including the native code 229 may be stored in the second file system 245 in preparation for the next execution. Since partial compilation has already been performed on the stored Java® bytecode 227, execution by the first execution control portion 257A may be performed.

According to the execution control portion 257 constituted as shown in FIG. 11, the Java® bytecode 227 determined by the compilation part determination portion 265 of the compilation portion 223 as having no parts to be compiled is provided for so-called JIT. Hence, optimization of the execution speed and economizing on the memory regions can be achieved by JIT instead of pre-compilation for the Java® bytecode 227 for which the compilation portion 233 has determined that pre-compilation is inappropriate.

FIG. 11 shows as an example a state in which the first execution control portion 257A and second execution control portion 257B exist side by side. However, the execution control portion 257 may comprise the execution control portion 257B alone. In this case, the execution control portion 257 may be constituted to on/off control the execution part frequency detection portion 286 and partial native compilation portion 287 according to whether the Java® bytecode 227 to be inputted includes the native code 229 or not.

Figure 12:
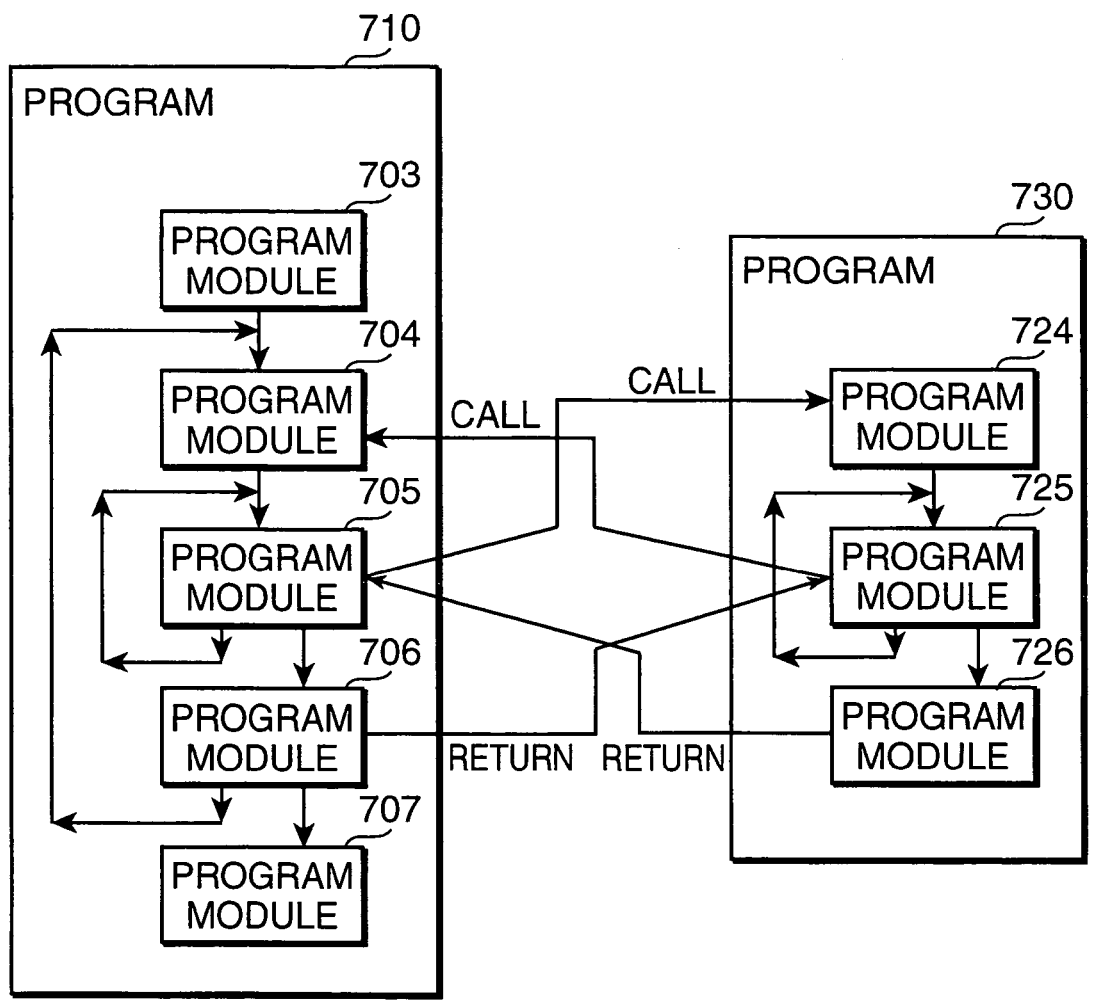
FIG. 12 is a view showing an example of a program having a re-entrant structure.

Returning to FIG. 8, when the compilation part determination portion 223 operates the re-entrant structure determination portion 267, the processing described below is realized. It is assumed that the source program that is subjected to processing by the compilation part determination portion 223, or in other words the Java® bytecode 221, comprises the loop structure shown in FIG. 12, for example. The Java® bytecode 221 shown as an example in FIG. 12 comprises a program 710 and a program 730. The program 710 comprises program modules 703 through 707, and the program 730 comprises program modules 724 through 726.

The program module 705 which constitutes a double loop in the caller program 710 calls the program module 724 included in the program 730. Meanwhile, in the program 730, the program module 725 which is executed following the program module 724 has a single loop structure. The program module 725 also calls the program module 704 which is included in the caller program 710, and which leads to execution of the program module 705 which calls itself.

This type of structure is typically known as a "re-entrant" structure. The program modules 704, 705, 706, 724, 725 and 726 constitute the re-entrant structure. When the re-entrant structure determination portion 267 of the compilation part determination portion 223 discovers such a re-entrant structure in the program subjected to compilation, the compilation part determination portion 233 determines this part as a priority compilation part. Hence the re-entrant structure is compiled preferentially by the partial native compilation portion 225. Since the re-entrant structure, which is a part of the Java® bytecode 221 having a high possibility of a large number of executions, is compiled preferentially, improvements in execution speed and economizing on the memory regions in the second file system 245 are optimized with great precision.

Figure 13:
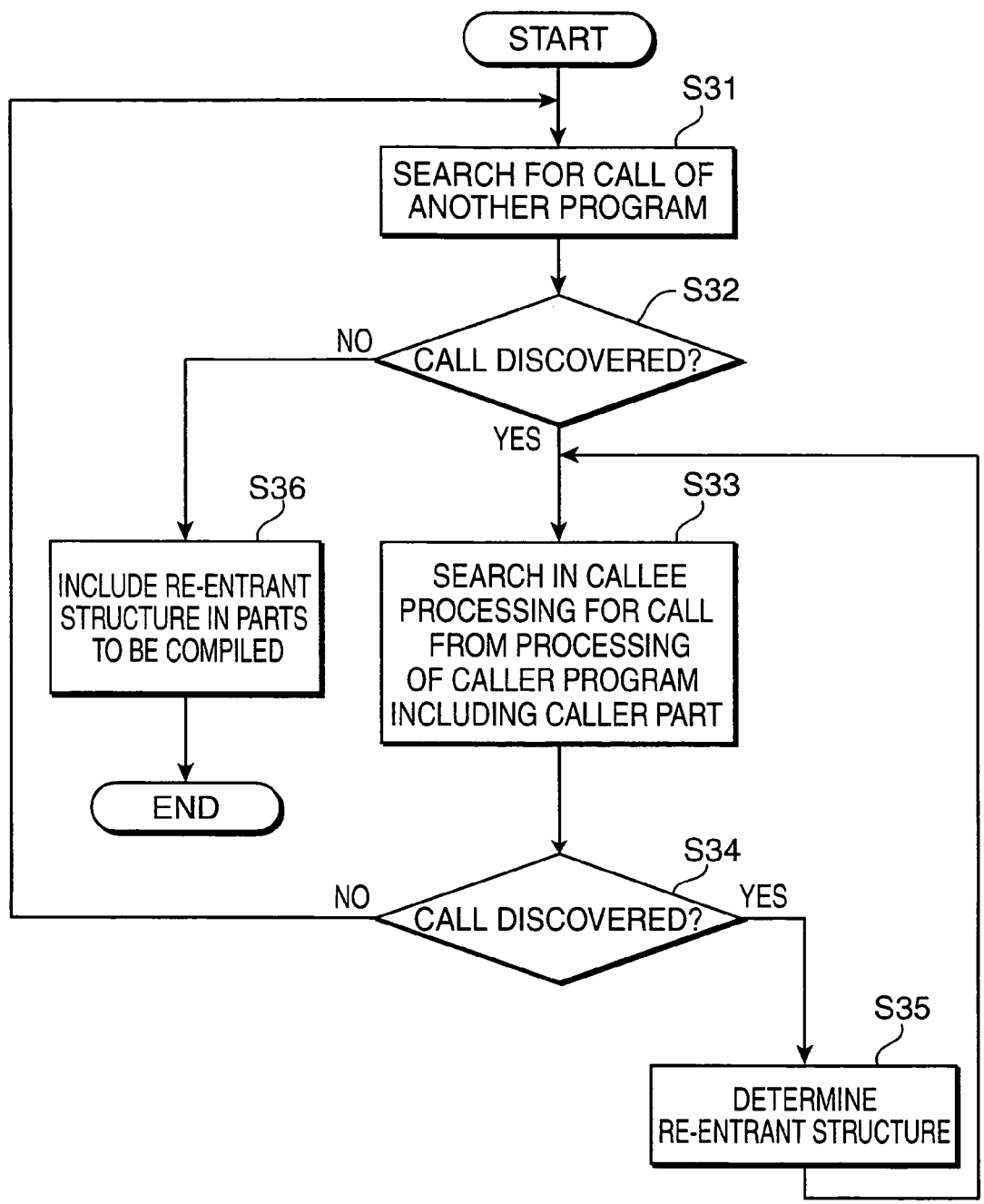
FIG. 13 is a flowchart showing a procedure in which the re-entrant structure is compiled preferentially by a compilation part determination portion in FIG. 8.

Next, an operating sequence relating to determination of a re-entrant structure by the compilation part determination portion 223 will be described in detail. FIG. 13 is a flowchart showing an operating sequence of the compilation part determination portion 223 relating to the determination of a re-entrant structure. The procedure in FIG. 13 may be executed parallel to the procedure in FIG. 9. For ease of explanation, it is assumed that the compilation part determination portion 223 uses the Java® bytecode 221 shown in FIG. 12 as a processing subject.

When the compilation part determination portion 223 begins the processing of FIG. 13, the call detection portion 262 searches the program 710, which serves as a main program, for a processing part that is calling another program (S31). When the call detection portion 262 detects such a processing part, or in other words the program module 705 (Yes in S32), the call detection portion 262 then searches the callee program 730 for a processing part (i.e., the program module 725) that is calling a processing part (i.e., the program modules 704, 705 and 706) which includes the caller part (i.e., the program module 705) in the program 710, which serves as the caller program (S33).

When the call detection portion 262 detects such a processing part, or in other words the program module 725 (Yes in S34), the re-entrant structure determination portion 267 determines that the called processing part (i.e., the program modules 724, 725 and 726) in the callee program 730 and the processing part (i.e., the program modules 704, 705 and 706) in the caller program 710 called back by the callee program 730 have a re-entrant structure (S35). The call detection portion 262 then repeats the processing of the step S33. When the call detection portion 262 does not detect any new processing parts (No in S34), the call detection portion 262 repeats the processing of the step S31. When the call detection portion 262 does not detect any new processing parts (No in S32), the compilation part determination portion 265 includes the processing part determined by the re-entrant structure determination portion 267 as a re-entrant structure in the parts to be compiled (S36).

Thereafter, the compilation part determination portion 223 ends the processing of FIG. 13. The partial native compilation portion 225 then compiles the loops determined by the compilation part determination portion 265 as parts to be compiled according to the processing in FIG. 9 and the re-entrant structures determined by the compilation part determination portion 265 as parts to be compiled according to the processing in FIG. 13 preferentially.

Other Embodiments

In the first embodiment, an example was described in which conversion from the Java® program code 121 to the Java®) bytecode 129 is performed in the development environment 105. However, the terminal device 205 may download the Java® program code 121 from the server 103 via the communication interface 210, for example, and execute conversion into the Java® bytecode 129 in the pre-link portion 231.

Brief Description of the Embodiments (1) A compiler for converting a source program into an object program causes a computer to execute: a multi-nested structure detection procedure for detecting a multi-nested structure included in the source program; a return destination address detection procedure for detecting a return destination address in each unit loop constituting the multi-nested structure; an address overlap determination procedure for determining whether or not overlapping return destination addresses sharing the same address are present among the plurality of return destination addresses detected in the return destination address detection procedure; and a dividing procedure which, when the address overlap determination procedure determines the presence of overlapping return destination addresses, converts the source program into an object program, serving as the aforementioned object program, in which the overlapping return destination addresses differ from each other.

According to this compiler, when overlapping return destination addresses are present among the return destination addresses of the unit loops constituting the multi-nested structure, the dividing procedure changes the overlapping addresses to different addresses to each other, and hence the loop depth can be calculated accurately. As a result, parts having a deep loop, and thus a high possibility of a large number of executions, can be extracted correctly and compiled preferentially.

(2) In the compiler according to (1), the dividing procedure comprises a command addition procedure for providing the overlapping return destination addresses with different addresses to each other by adding an unnecessary command which does not affect execution to one of the overlapping return destination addresses.

According to this compiler, overlapping return destination addresses are made different to each other by adding an unnecessary command in the dividing procedure, and hence the loop depth can be calculated correctly with no effect on execution.

(3) A compiler for converting first and second source programs into an object program causes a computer to execute: a first loop detection procedure for detecting a first loop having a multi-nested or single-nested structure which is included in the first source program; a second loop detection procedure for detecting a second loop having a multi-nested or single-nested structure which is included in the second source program that is called from within the first loop; a loop depth evaluation procedure for calculating a total number of nests by adding the number of nests in the first loop to the number of nests in the second loop; and a partial compilation procedure for converting the first and second source programs into the object program by compiling the second loop, in which the total number of nests is largest, preferentially.

According to this compiler, the total number of nests, which includes the number of nests in the first loop included in one of the source programs and the number of nests in the second loop included in the other source program that is called from within the first loop, is calculated as well as simply the number of nests in the first loop included in one of the source programs, and the second loop, which has the greater total number of nests, is compiled preferentially. In other words, the depth of the loop executed at the call source and the depth of the loop executed at the call destination are considered together in order to compile the loop which has the highest possibility of a large number of executions and the greatest total number of nests preferentially.

(4) A compiler for converting a plurality of source programs into an object program causes a computer to execute: a first loop detection procedure for searching for a first loop having a multi-nested or single-nested structure which is included in one of the plurality of source programs; a second loop detection procedure which, when the first loop detection procedure detects the first loop, searches for a second loop having a multi-nested or single-nested structure which is included in another source program from among the plurality of source programs that is called from within the first loop; a first iteration procedure which, when the second loop detection procedure detects the second loop, iterates the second loop detection procedure assuming that the first loop detection procedure has detected the first loop; a loop depth evaluation procedure which, when one of the first loop and second loop is not detected, calculates the loop depth, which is the total number of nests in the loops detected so far; a second iteration procedure for iterating processing from the first loop detection procedure to the loop depth evaluation procedure until the first loop is no longer detected; and a partial compilation procedure for converting the plurality of source programs into the object program by compiling the loop having the greatest loop depth from among the plurality of source programs preferentially.

According to this compiler, the total number of nests, which includes the number of nests in the loop included in one source program and the number of nests in the loops included in the source programs that are called in sequence from the first loop, is calculated as well as simply the number of nests in the loop included in one of the source programs, and the loop which has the greater total number of nests is compiled preferentially. In other words, the loop having the greatest total number of nests, including the multi-nested structure constituted from among the source programs which are called in sequence from one of the source programs, is compiled preferentially. Hence parts having a high possibility of a large number of executions from among the source programs are extracted with good precision and compiled.

(5) In the compiler according to (4), the partial compilation procedure does not compile any part of the plurality of source programs when a maximum value of the loop depth calculated in the loop depth evaluation procedure does not meet a predetermined threshold.

According to this compiler, when the maximum loop depth value does not meet the threshold, no part of the plurality of source programs are compiled, and thus wasteful compilation of parts which contribute little to improvements in execution speed, leading to the wasteful use of memory regions, can be avoided.

(6) In the compiler according to (4) or (5), the computer is further caused to execute a uniformity evaluation procedure which, when a plurality of loop depths are calculated in the loop depth evaluation procedure, determines whether or not the plurality of loop depths are uniform. When the uniformity evaluation procedure determines that the plurality of loop depths are uniform, the partial compilation procedure does not compile any part of the plurality of source programs.

According to this compiler, when the plurality of loop depths are uniform, no part of the plurality of source programs are compiled, and hence compilation of a large number of parts having an approximately equal contribution to improvements in execution speed, which impairs the effective use of memory regions, can be avoided.

(7) A compiler for converting first and second source programs into an object program causes a computer to execute: a first iterative execution portion detection procedure for detecting a first iterative execution portion, which is a part that is executed iteratively, included in the first source program; a second iterative execution portion detection procedure for detecting a second iterative execution portion, which is a part that is executed iteratively, included in the second source program that is called from within the first iterative execution portion; a total execution number evaluation procedure for calculating a total number of executions by adding the number of executions of the first iterative execution portion to the number of executions of the second iterative execution portion; and a partial compilation procedure for converting the first and second source programs into the object program by compiling the second iterative execution portion, in which the total number of executions is largest, preferentially.

According to this compiler, the total number of executions, which includes the number of executions of the first iterative execution portion included in one of the source programs and the number of executions of the second iterative execution portion included in the other source program that is called from within the first iterative execution portion, is calculated as well as simply the number of executions of the first iterative execution portion included in one of the source programs, and the second iterative execution portion, which has the greater total number of executions, is compiled preferentially. In other words, the number of executions of the iterative execution portion executed at the call source and the number of executions of the iterative execution portion executed at the call destination are considered together in order to compile the iterative execution portion having the largest total number of executions preferentially.

(8) A compiler for converting a plurality of source programs into an object program causes a computer to execute: a first iterative execution portion detection procedure for searching for a first iterative execution portion, which is a part that is executed iteratively, included in one of the plurality of source programs; a second iterative execution portion detection procedure which, when the first iterative execution portion detection procedure detects the first iterative execution portion, searches for a second iterative execution portion which is executed iteratively, included in another source program from among the plurality of source programs that is called from within the first iterative execution portion; a first iteration procedure which, when the second iterative execution portion detection procedure detects the second iterative execution portion, iterates the second iterative execution portion detection procedure assuming that the first iterative execution portion detection procedure has detected the first iterative execution portion; a total execution number evaluation procedure which, when one of the first iterative execution portion and second iterative execution portion is not detected, calculates the total number of executions, which is the sum of the number of executions of the iterative execution portions detected so far; a second iteration procedure for iterating processing from the first iterative execution portion detection procedure to the total execution number evaluation procedure until the first iterative execution portion is no longer detected; and a partial compilation procedure for converting the plurality of source programs into the object program by compiling the iterative execution portion having the largest total number of executions from among the plurality of source programs preferentially.

According to this compiler, the total number of executions, which includes the number of executions of the iterative execution portion included in one source program and the number of executions of the iterative execution portions included in the source programs that are called in sequence from the first iterative execution portion, is calculated as well as simply the number of executions of the iterative execution portion included in one of the source programs, and the iterative execution portion which has the greater total number of executions is compiled preferentially. In other words, the iterative execution portion having the greatest total number of executions, including the multiple structure of the iterative execution portions constituted from among the source programs which are called in sequence from one of the source programs, is compiled preferentially. Hence parts having a large number of executions from among the source programs are extracted with good precision and compiled.

(9) In the compiler according to (8), the partial compilation procedure does not compile any part of the plurality of source programs when a maximum value of the total number of executions calculated in the total execution number evaluation procedure does not meet a predetermined threshold.

According to this compiler, when the maximum value of the total number of executions does not meet the threshold, no part of the plurality of source programs is compiled, and thus wasteful compilation of parts which contribute little to improvements in execution speed, leading to the wasteful use of memory regions, can be avoided.

(10) In the compiler according to (8) or (9), the computer is further caused to execute a uniformity evaluation procedure which, when a plurality of total execution numbers are calculated in the total execution number evaluation procedure, determines whether or not the plurality of total execution numbers are uniform. When the uniformity evaluation procedure determines that the plurality of total execution numbers are uniform, the partial compilation procedure does not compile any part of the plurality of source programs.

According to this compiler, when the plurality of total execution numbers is uniform, no part of the plurality of source programs is compiled, and hence compilation of a large number of parts having an approximately equal contribution to improvements in execution speed, which impairs the effective use of memory regions, can be avoided.

(11) A compiler for converting first and second source programs into an object program causes a computer to execute: a first call detection procedure for searching for a second processing part, which is a loop or non-loop having a multi-nested or single-nested structure included in the second source program, that is called from within a first processing part, which is a loop or non-loop having a multi-nested or single-nested structure included in the first source program; a second call detection procedure which, when said first call detection procedure detects said second processing part, searches said first source program for a third processing part which is called from within said second processing part and includes said first processing part; and a partial compiling procedure which, when said second call detection procedure detects said third processing part, converts said first and second source programs into said object program by compiling said second and third processing parts from among said first and second source programs.

According to this compiler, the first and second call detection procedures detect a so-called re-entrant structure exiting between the first and second source programs, and the partial compilation procedure compiles the detected re-entrant structure. In other words, the re-entrant structure, which is a part of the source programs having a high possibility of a large number of executions, is extracted and compiled.

(12) A compiler for converting a source program into an object program causes a computer to execute: a multi-nested structure detection procedure for detecting a multi-nested structure included in the source program; a return destination address detection procedure for detecting a return destination address in each unit loop constituting the multi-nested structure; an unnecessary command detection procedure for determining whether or not a return destination address comprising an unnecessary command, which is a command that does not affect execution, is present among the plurality of return destination addresses detected in the return destination address detection procedure; and an unnecessary command deletion procedure which, when a return destination address comprising an unnecessary command is detected in the unnecessary command detection procedure, converts the source program into an object program, serving as the aforementioned object program, in which the unnecessary command has been deleted.

According to this compiler, when an unnecessary command is present among the return destination addresses of the unit loops constituting the multi-nested structure, the unnecessary command deletion procedure deletes the unnecessary command, and hence delays in the execution speed caused by the unnecessary command can be avoided. In other words, by deleting the unnecessary command, which enables a part having a deep loop with a high possibility of a large number of executions to be extracted correctly and compiled preferentially, following compilation, the execution speed can be increased further while economizing on memory regions.

(13) A program product comprises the compiler according to any one of (1) through (12), and a signal retention medium for retaining the compiler.

According to this program product, one of the compilers (1) through (12) is retained in the signal retention medium, and hence when the compiler is read onto a computer through this signal retention medium, parts of the source program having a large number of executions, or parts having a high possibility of a large number of executions, can be extracted with good precision and compiled. The signal retention medium may be at least one of a recording medium and a transmission medium.

(14) A compilation device for converting a source program into an object program comprises: multi-nested structure detection means for detecting a multi-nested structure included in the source program; return destination address detection means for detecting a return destination address in each unit loop constituting the multi-nested structure; address overlap determination means for determining whether or not overlapping return destination addresses sharing the same address are present among the plurality of return destination addresses detected by the return destination address detection means; and dividing means which, when the address overlap determination means determine the presence of overlapping return destination addresses, convert the source program into an object program, serving as the aforementioned object program, in which the overlapping return destination addresses differ from each other.

According to this compilation device, when overlapping return destination addresses are present among the return destination addresses of the unit loops constituting the multi-nested structure, the dividing means change the overlapping addresses to different addresses to each other, and hence the loop depth can be calculated correctly. As a result, parts having a deep loop with a high possibility of a large number of executions can be selected correctly and compiled preferentially.

(15) A compilation device for converting a plurality of source programs into an object program comprises: first loop detection means for searching for a first loop having a multi-nested or single-nested structure which is included in one source program from among the plurality of source programs; second loop detection means which, whenever the first loop detection means detect the first loop, search for a second loop having a multi-nested or single-nested structure which is included in another source program from among the plurality of source programs that is called from within the first loop, and which, when the second loop is detected, search for another second loop, assuming that the first loop detection means have detected the first loop, in order to search for a multi-nested structure which is constituted among the aforementioned one source program and each source program that is called in sequence from this one source program; loop depth evaluation means which, whenever the first loop is detected by the first loop detection means, calculate the loop depth, which is a number of nests in said first loop to which, when said second loop detection means has detected said second loop, a number of nests of each detected second loop is added sequentially; and partial compilation means for converting the plurality of source programs into the object program by compiling the loop having the greatest loop depth from among the plurality of source programs preferentially.

According to this compilation device, the total number of nests, which includes the number of nests in the loops included in one source program and the number of nests in the loops included in the source programs that are called sequentially from the first loop, is calculated as well as simply the number of nests in the loops included in one of the source programs, and the loop which has the greater total number of nests is compiled preferentially. In other words, the loop having the largest total number of nests, including the multi-nested structure constituted from among the source programs the source programs which are called in sequence from one of the source programs, is compiled preferentially. Hence parts of the source programs having a high possibility of a large number of executions are extracted with good precision and compiled.

(16) In the compilation device according to (15), the partial compilation means does not compile any part of the plurality of source programs when a maximum value of the loop depth calculated by the loop depth evaluation means does not meet a predetermined threshold.

According to this compilation device, when the maximum loop depth value does not meet the threshold, no part of the plurality of source programs is compiled, and thus wasteful compilation of parts which contribute little to improvements in execution speed, leading to the wasteful use of memory regions, can be avoided.

(17) The compilation device according to (15) or (16) further comprises uniformity evaluation means which, when a plurality of loop depths are calculated by the loop depth evaluation means, determine whether or not the plurality of loop depths are uniform. When the uniformity evaluation means determine that the plurality of loop depths are uniform, the partial compilation means do not compile any part of the plurality of source programs.

According to this compilation device, when the plurality of loop depths are uniform, no part of the plurality of source programs is compiled, and hence compilation of a large number of parts having an approximately equal contribution to improvements in execution speed, which impairs the effective use of memory regions, can be avoided.

(18) A communication terminal device comprises: the compilation device according to any of (14) through (17); communication means for obtaining via a transmission medium a source program to be compiled by the compilation device; and execution control means for executing an object program generated by the compilation device.

According to this communication terminal device, the communication terminal device comprises communication means, and hence the source program can be obtained through a transmission medium and compiled by the compilation device. The communication terminal device also comprises execution control means, and hence the compiled object program can be executed. In other words, according to this communication terminal device, a source program obtained through a transmission medium can be executed. Further, the communication terminal comprises the compilation device of the present invention, and hence improvements in execution speed and economizing on the use of memory regions can be optimized with good precision.

(19) In the communication terminal device according to (18), the execution control portion also subjects a non-compiled program, which is a source program subjected to processing by the compilation device and having no part thereof compiled, to execution. The execution control portion comprises: frequency detection means for detecting a high frequency execution part, which is a part of the non-compiled program that is executed at a frequency exceeding a set reference value during execution of the non-compiled program; and another partial compilation means for compiling the high frequency execution part detected by the frequency detection portion.

According to this communication terminal device, a high frequency execution part detected by the frequency detection means during execution of the non-compiled program is compiled by the partial compilation means. In other words, the non-compiled program is compiled by so-called JIT. Hence when it is inappropriate for the compilation device to perform pre-compilation from the point of view of optimization of improvements in execution speed and economizing on memory regions, this optimization can be achieved through JIT instead.

(20) A compilation method in which a computer converts a source program into an object program comprises the steps of: detecting a multi-nested structure included in the source program; detecting a return destination address in each unit loop constituting the multi-nested structure; determining whether or not overlapping return destination addresses sharing the same address are present among the plurality of return destination addresses detected in the return destination address detection step; and when the presence of overlapping return destination addresses is determined in the address overlap determination step, converting the source program into an object program, serving as the aforementioned object program, in which the overlapping return destination addresses are divided so as to differ from each other.

According to this compilation method, when overlapping return destination addresses are present among the return destination addresses of the unit loops constituting a multi-nested structure, the dividing step changes the overlapping addresses to different addresses to each other, and hence the loop depth can be calculated accurately. As a result, parts having a deep loop, and thus a high possibility of a large number of executions, can be extracted correctly and compiled preferentially.

This application is based on Japanese Patent Application Serial No. 2003-106413, filed in the Japan Patent Office on Apr. 10, 2003, the contents of which are hereby incorporated be reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A program product comprising:
a compiler that converts a source program into an object program, and causes a computer to execute:
a multi-nested structure detection procedure that detects a multi-nested structure having a unit loop inside another unit loop, and included in the source program;
a return destination address detection procedure that detects return destination addresses indicating initial addresses of destinations to which a processing returns in accordance with a final command in each unit loop constituting the multi-nested structure returns;
an address overlap determination procedure that determines whether or not overlapping return destination addresses sharing the same address are present among the return destination addresses detected during the return destination address detection procedure; and a dividing procedure which, when the address overlap determination procedure determines the presence of the overlapping return destination addresses, converts the source program into an object program, serving as the object program, in which the overlapping return destination addresses differ from each other; and a computer-readable recording medium that stores said compiler.

2. The program product according to claim 1, wherein the dividing procedure comprises a command addition procedure that adds to the overlapping return destination addresses with different addresses an unnecessary command which does not affect execution to one of the overlapping return destination addresses.

3. A program stored on a computer-readable recording medium for causing a compiler to perform a method of converting a source program into an object program, the method comprising:

a multi-nested structure detection procedure for detecting a multi-nested structure having a unit loop inside another unit loop, and included in the source program;

a return destination address detection procedure for detecting return destination addresses indicating initial addresses of destinations to which a processing returns in accordance with a final command in each unit loop constituting the multi-nested structure returns;

an address overlap determination procedure for determining whether or not overlapping return destination addresses sharing the same address are present among the return destination addresses detected during the return destination address detection procedure; and a dividing procedure which, when the address overlap determination procedure determines the presence of the overlapping return destination addresses, converts the source program into an object program, serving as the object program, in which said overlapping return destination addresses differ from each other.

4. A compiler stored on a computer-readable recording medium for causing a computer to convert a source program into an object program, the compiler comprising:

a multi-nested structure detection means for detecting a multi-nested structure having a unit loop inside another unit loop, and included in the source program;

a return destination address detection means for detecting return destination addresses indicating initial addresses of destinations to which a processing returns in accordance with a final command in each unit loop constituting the multi-nested structure returns;

an address overlap determination means for determining whether or not overlapping return destination addresses sharing the same address are present among the return destination addresses detected by said return destination address detection means; and a dividing means which, when said address overlap determination means determines the presence of the overlapping return destination addresses, converts the source program into an object program, serving as the object program, in which the overlapping return destination addresses differ from each other.

5. A communication terminal device comprising:

a compilation device for converting a source program into an object program, comprising:

a multi-nested structure detection means for detecting a multi-nested structure having a unit loop inside another unit loop, and included in the source program;

a return destination address detection means for detecting return destination addresses indicating initial addresses of destinations to which a processing returns in accordance with a final command in each unit loop constituting said multi-nested structure returns;

an address overlap determination means for determining whether or not overlapping return destination addresses sharing the same address are present among the return destination addresses detected by said return destination address detection means; and a dividing means which, when said address overlap determination means determines the presence of the overlapping return destination addresses, converts the source program into an object program, serving as the object program, in which the overlapping return destination addresses differ from each other;

a communication means for obtaining via a transmission medium a source program to be compiled by said compilation device; and an execution control means for executing an object program generated by said compilation device.

6. The communication terminal device according to claim 5, wherein said execution control means also subjects a non-compiled program, which is a source program subjected to processing by said compilation device and having no part thereof compiled, to execution, said execution control means comprising:

a frequency detection means for detecting a high frequency execution part, which is a part of the non-compiled program that is executed at a frequency exceeding a set reference value during execution of the non-compiled program; and another partial compilation means for compiling the high frequency execution part detected by said frequency detection means.

7. A compilation method in which a computer converts a source program into an object program, comprising the steps of:

detecting a multi-nested structure having a unit loop inside another unit loop, and included in the source program;

detecting a return destination address indicating initial addresses of destinations to which a processing returns in accordance with a final command in each unit loop constituting the multi-nested structure returns;

determining whether or not overlapping return destination addresses sharing the same address are present among the return destination addresses detected during the return destination address detection step; and when the presence of the overlapping return destination addresses is determined in the address overlap determination, converting the source program into an object program, serving as the object program, in which the overlapping return destination addresses are divided so as to differ from each other.

* * * * *